Sept. 11, 1962 H. GEISTHOFF 3,053,062
PROTECTION FOR ARTICULATED SHAFTS
Filed July 5, 1960 4 Sheets-Sheet 2

Inventor
HUBERT GEISTHOFF

By Toulmin & Toulmin
Attorneys

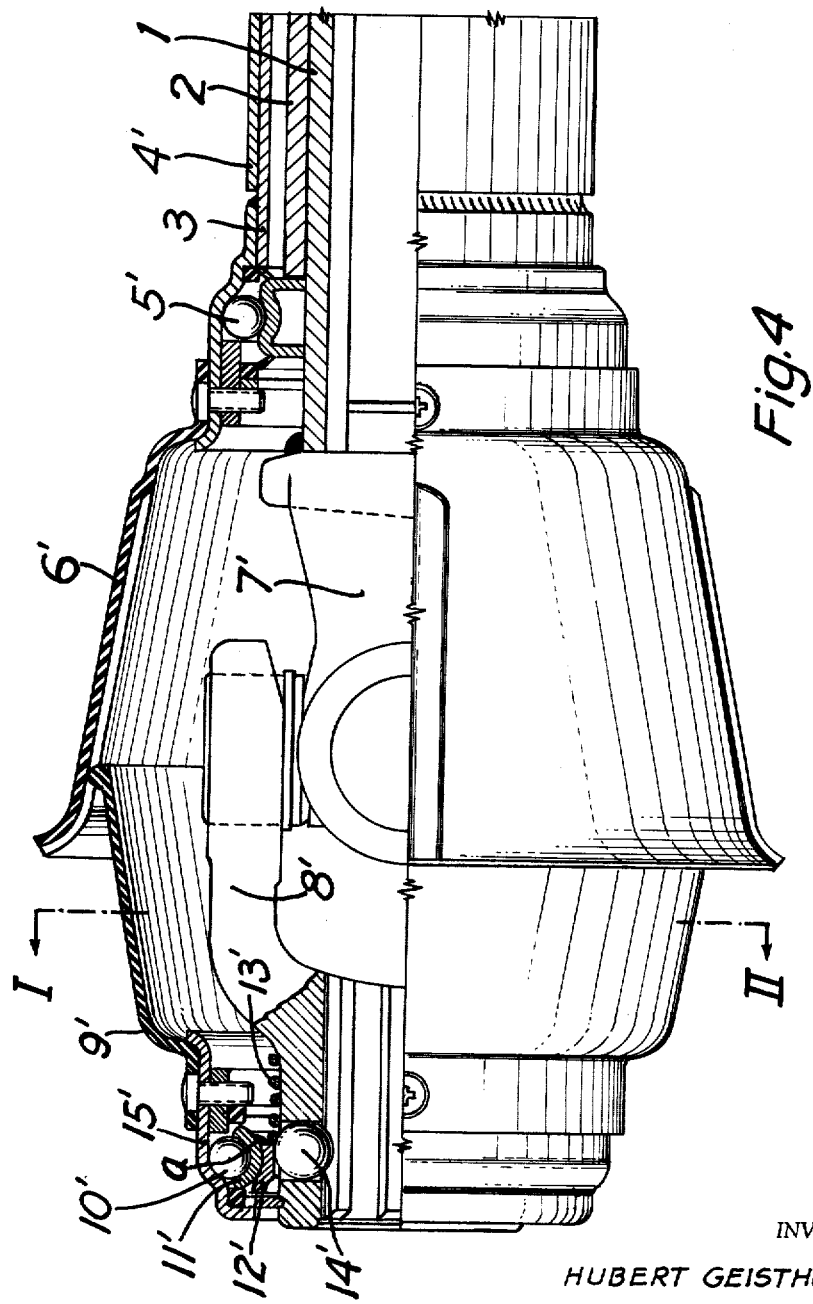

United States Patent Office 3,053,062
Patented Sept. 11, 1962

3,053,062
PROTECTION FOR ARTICULATED SHAFTS
Hubert Geisthoff, Lohmar, Germany, assignor to Bernhard Walterscheid-Muller, and Kurt Schroter, both of Lohmar, Germany
Filed July 5, 1960, Ser. No. 40,969
Claims priority, application Germany July 21, 1959
8 Claims. (Cl. 64—4)

The present invention relates to agricultural machinery and more in particular to a protection for articulated shafts used in agricultural machinery.

The known protective devices for the articulated or Cardan shafts in agricultural machinery suffer from a number of disadvantages. A first disadvantage resides in the fact that the protective devices have to be equipped with special attachment means which differ from case to case and must be attached to each particular type of agricultural machine. For that reason a particular known protective device cannot be used for protecting the articulated shafts in any desirable agricultural machine. In addition, the necessity of attaching the protective device to the agricultural machine is frequently considered as a nuisance and it often occurs that the protective device is not attached as it is too complicated and time-consuming. Furthermore, the known protections are comparatively sensitive and not particularly suitable for the rough farming service.

With the foregoing in mind, it is the general object of the present invention to provide a protection for the articulated shafts in agricultural machines which is simple, reliable and affords excellent protection for all running parts of the articulated shaft and covers all portions of the shaft.

It is another object of the present invention to provide a protection for the articulated shafts in agricultural machines which can be used with any agricultural machine without requiring particular attachment means.

It is a further object of the present invention to provide a protection for the articulated shafts in agricultural machines which is very sturdy and reliable and well adapted to rough farming service.

These objects as well as further objects and advantages, which will become apparent as the description proceeds, are achieved by the protection of the present invention which comprises a protective tube which is rotatably mounted on the articulated shaft and which is length-extensible. The protective tube has funnel-shaped enlarged end portions, covering at least the interior portions of the joint.

According to the invention there is further provided a protective body for protecting the exterior portions of the joint which is also rotatably provided and which has a barrel- or funnel-shaped configuration. This additional protective body either partly covers the enlarged end portions of the protective tube or is partly covered thereby.

The protective tube, or at least its funnel-shaped enlarged end portions, as well as the barrel-shaped or funnel-shaped protective body are preferably composed of a resilient material such as a slightly resilient sheet metal or a slightly flexible plastic material. The protective body, protecting the exterior joint portions, can be secured in position so as to be prevented from rotating with the shaft.

According to a preferred embodiment of the invention at least the protective body, and eventually also the funnel-shaped enlarged end portions of the protective tube, have a known circular cross section. This makes it possible to obtain a friction coupling between the protective bodies and the funnel-shaped end portions of the protective tube. It is also of considerable advantage to provide mounting rings for the protective bodies and ball bearings between these mounting rings and the hubs of the outer joint portions.

According to a particularly advantageous embodiment of the invention, the mounting ring for the protective body is disposed on a spring-actuated slide member. The slide member is disposed on top of a locking member axially securing in position the exterior shaft portion.

The mounting ring can be positioned on a ball bearing disposed intermediate the mounting ring and the slide member. Furthermore, the slide member can be fixedly connected with the protective body.

The invention will be more fully appreciated upon the following description of the accompanying drawings, wherein FIGURE 1 is a side elevational view, partly in section, of the protective device of the present invention;

FIGURE 4 is a side elevational view, partly in section, of the protective device of the present invention with a slight modification.

Figure 1:
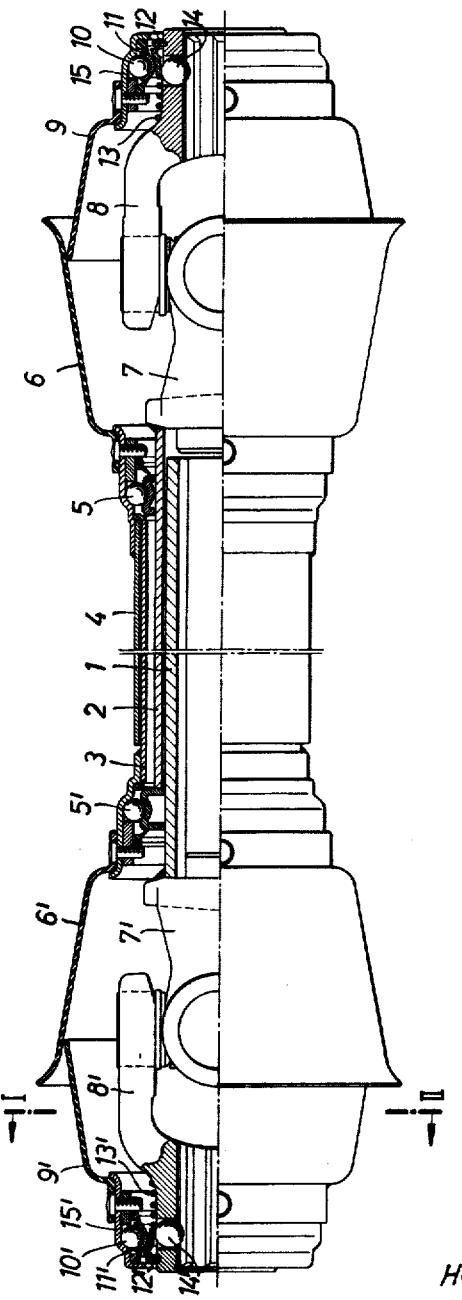
Figure 2:
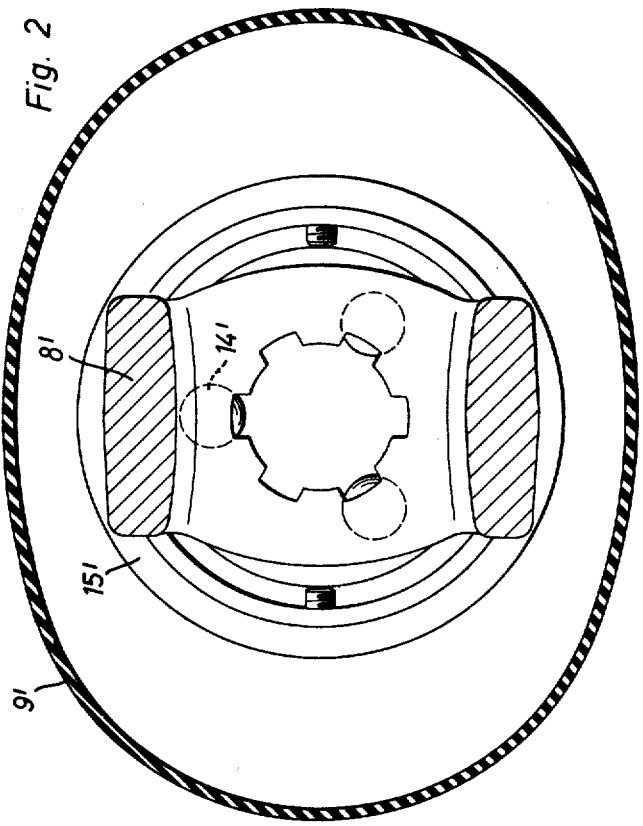
FIGURE 2 is a cross sectional view along lines I—I in FIGURE 1.
Figure 3:
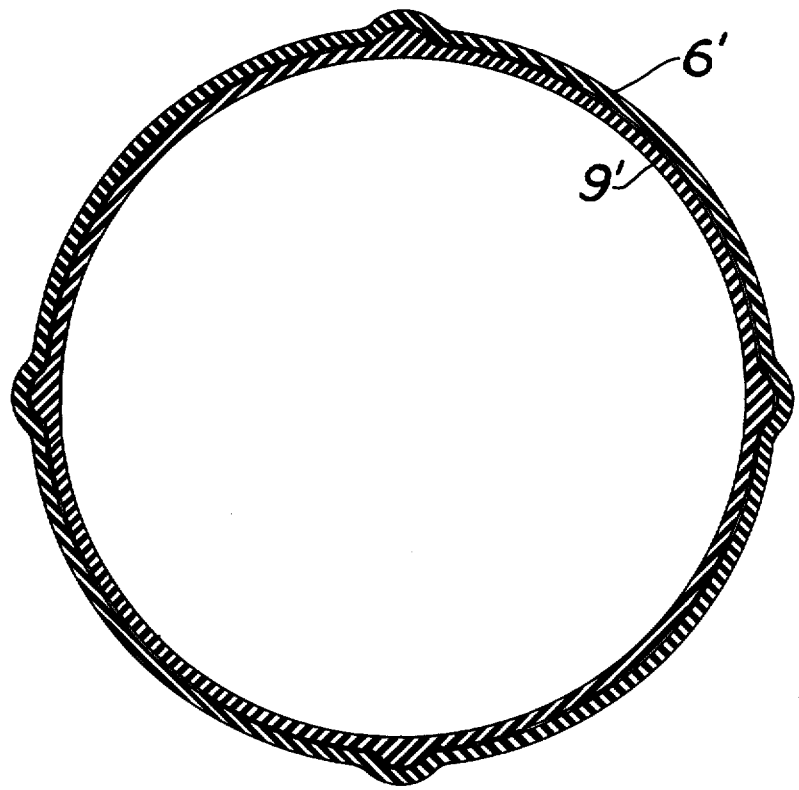
FIGURE 3 is a cross-sectional view of the funnel-shaped enlarged end portions of the protective tube having a circular cross section.

Referring now to the drawings more in detail, the articulated shaft may comprise two portions 1, 2, assembled in a telescope-like manner. Above the shaft there is disposed the protective tube, comprising the two portions 3 and 4. The protective tube 3, 4 is rotatably positioned on shaft 1, 2 by means of ball bearings 5, 5'. At its respective ends, the protective tube has funnel-shaped enlarged portions 6, 6', covering the interior portions of the shaft 7, 7'. The exterior shaft portions 8, 8' are protected by barrel- or funnel-shaped protective bodies 9, 9' which are connected with mounting rings 15, 15' and with the latter rotatably positioned on ball bearings 10, 10'. The inner guide rings 11, 11' of ball bearings 10, 10' can be fixedly connected with the slide members 12, 12', for instance by welding spots as shown in FIGURE 4. The slide members 12, 12' are displaceable against the action of pressure springs 13, 13' on the hub of the exterior shaft portions 8, 8', in a right-hand direction in the drawings. They also press radially inwardly spherical-shaped locking members 14, 14', thereby supporting the shaft portions 8, 8' on shaft journals, not shown. The funnel-shaped portions 6, 6' and the funnel-shaped protective bodies 9, 9' may have a circular cross-section, as shown in FIGURE 3. However, according to a preferred embodiment of the invention which is shown, for example, in FIGURE 2, the protective bodies 9, 9' have a non-circular cross section. Preferably, they are composed of resilient material such as, for example, a slightly resilient sheet metal or plastic material. Due to this resiliency and the non-circular cross section it is possible to obtain a friction coupling connection between the protective bodies 9, 9' and the enlarged portions 6, 6' of the protective tube 3, 4. As shown in FIGURE 1, portions 6, 6' partly cover the protective bodies 9, 9'. It is, however, also possible to have the enlarged portions 6, 6' partly covered by the protective bodies 9, 9'.

Either the protective tube 3, 4 or the protective body 9, 9' are secured against rotating together with shaft 1, 2 by being fixedly connected with a stationary part of the agricultural machine.

After axially displacing the slide member 12, 12' against springs 13, 13', the locking members 14, 14' are unlocked and it is then possible to couple or decouple the exterior shaft portions 8, 8' with the shaft journals to or from the agricultural machine.

The particular configuration of the protective device 9, 9' as well as their resiliency make it possible to axially displace the protective bodies relative to the funnel-shaped enlarged portions 6, 6' of protective body 3, 4.

The protection of the invention offers great advantages. It perfectly and totally covers all running parts of the articulated shaft. In addition, it need not be particularly attached, since it is provided ready assembled to the shaft. Special attachment means become unnecessary. Furthermore, it is suitable for any articulated shaft in any agricultural machine. Last, not least, the protection is very sturdy and can withstand wear and sudden shocks occurring in the course of farming.

Finally, the production costs of the protection of the invention are greatly reduced compared with known protective devices.

It will be understood that this invention is susceptible to modification in order to adapt it to different usages and conditions and, accordingly, it is desired to comprehend such modifications within this invention as may fall within the scope of the appended claims.

What I claim is:

1. A protective device for an articulated shaft in agricultural machines having a plurality of joints, said device comprising a length-extensible protective tube rotatably positioned about the articulated shaft and having at its opposite ends funnel-shaped enlarged end portions covering at least the interior portions of the articulated shaft, and a pair of protective bodies rotatably attached to the exterior joint portions of the articulated shaft at opposite ends thereof, thereby covering the articulated shaft at the exterior joint portions thereof.

2. A protective device for an articulated shaft in agricultural machines as described in claim 1, said protective bodies being funnel-shaped.

3. A protective device for an articulated shaft in agricultural machines as described in claim 1, said protective bodies being barrel-shaped.

4. A protective device for an articulated shaft in agricultural machines as described in claim 1, said protective bodies being partly covered by said funnel-shaped enlarged end portions of said protective tube.

5. A protective device for an articulated shaft in agricultural machines as described in claim 1, said protective bodies being composed of a resilient material.

6. A protective device for an articulated shaft in agricultural machines as described in claim 1, said protective bodies having a non-circular cross section and being partly covered by said funnel-shaped enlarged end portions of said protective tube so as to form a friction coupling connection therewith.

7. A protective device for an articulated shaft having hub portions in agricultural machines having a plurality of joints, said device comprising a length-extensible protective tube rotatably positioned about the articulated shaft and having at its opposite ends funnel-shaped enlarged end portions covering at least the interior portions of the articulated shaft, and a pair of protective bodies rotatably attached to the exterior joint portions of the articulated shaft at opposite ends thereof, and further comprising a pair of mounting rings for said protective bodies, and a pair of ball bearings between said mounting rings and said hub portions of the exterior portions of said articulated shaft.

8. A protective device according to claim 7, comprising a pair of slide members axially slidably positioned on said hub portions of the exterior portions of said articulated shaft, spring means urging against said slide members, and a pair of locking members being urged inwardly with respect to the longitudinal axis of said articulated shaft by said slide members, said mounting rings being rotatably positioned on said slide members.

References Cited in the file of this patent

UNITED STATES PATENTS

| | | |
|---|---|---|
| 2,027,329 | Van Ranst | Jan. 7, 1936 |
| 2,793,512 | Larsen | May 28, 1957 |
| 2,952,142 | Schroter et al. | Sept. 13, 1960 |

FOREIGN PATENTS

| | | |
|---|---|---|
| 761,389 | Great Britain | Nov. 14, 1956 |